March 4, 1947.  C. C. BALDWIN  2,416,731
LOAD CARRYING STRUCTURE FOR TRACTORS
Filed Sept. 4, 1944
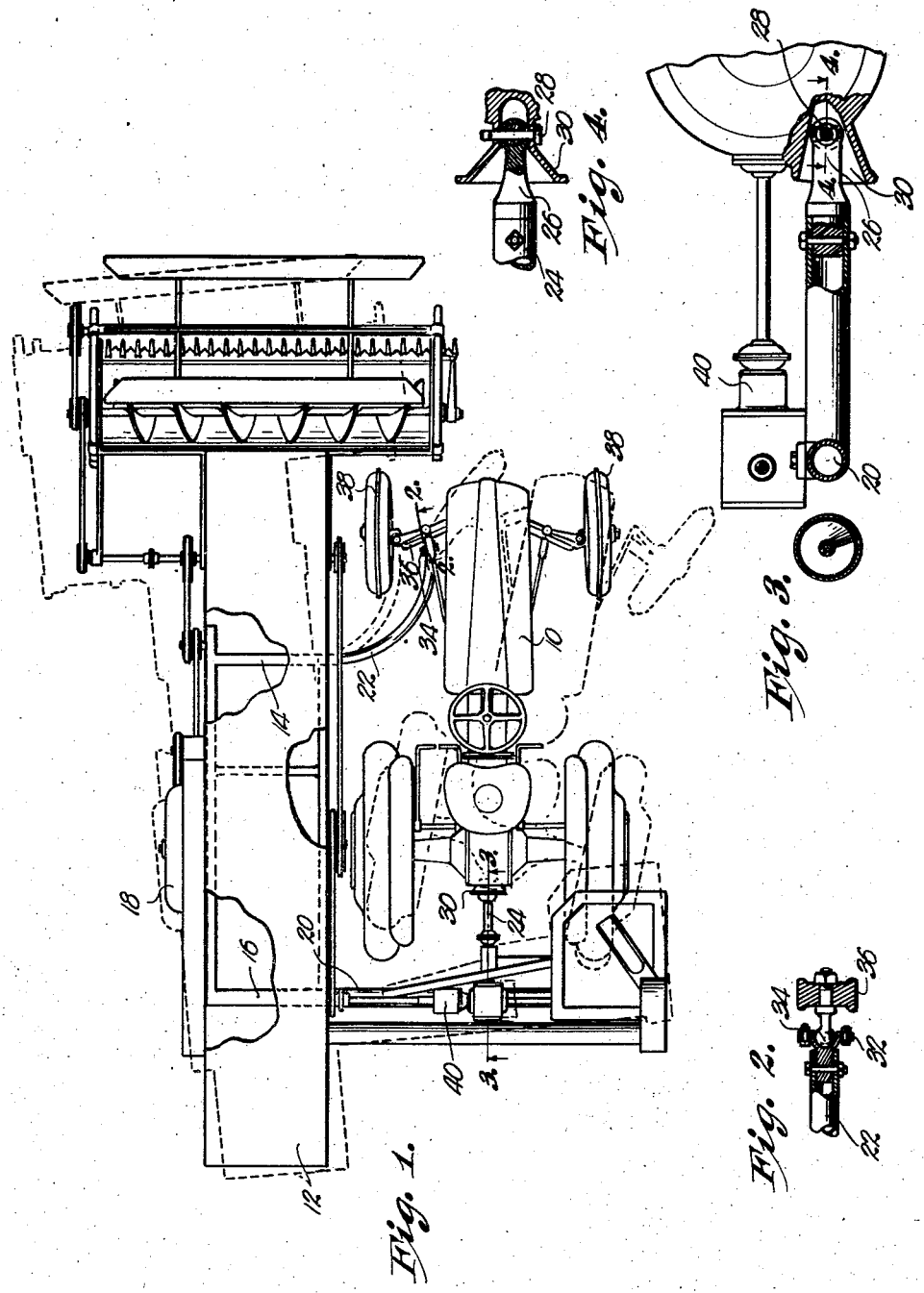
INVENTOR
Curtis C. Baldwin
BY
ATTORNEY Patented Mar. 4, 1947

2,416,731

UNITED STATES PATENT OFFICE 2,416,731

LOAD-CARRYING STRUCTURE FOR TRACTORS

Curtis C. Baldwin, Ottawa, Kans.

Application September 4, 1944, Serial No. 552,608

3 Claims. (Cl. 280—33.44)

1

This invention pertains to means for operably securing equipment to tractors of the four wheel type and has for a primary aim to provide load-carrying structure that is disposed to one side of the tractor but which may be coupled in place by manipulating the tractor only.

A still further object of the invention is the provision of load-carrying structure for tractors, capable of being operatively associated with the tractor with a minimum amount of effort and may be detached by removing a few bolts at the two points of attachment.

A yet further aim of this invention is to provide specially formed frame-work for securement to tractors and designed to carry farm implements, material handling equipment, or other devices.

Heretofore, side draft, load-carrying framework for tractors has required much work in attaching and detaching, due to the necessity of moving either the tractor or frame-work laterally toward one another, or the necessity of assembling and disassembling parts of the framework to accomplish attachment. It is one of the important objects of this invention to provide structure of the aforementioned character, that may be shifted into position by the movement of the tractor while the tractor is driven into position where the couplings are effective in establishing connection between the frame-work of the structure and parts of the tractor.

Other objects of the invention will appear during the course of the following specification, referring to the accompanying drawing, wherein:

Fig. 1 is a top plan view of a combine and tractor assembly, having structure effecting interconnection between the two, made in accordance with the present invention.

Fig. 2 is an enlarged fragmentary sectional view taken on line II—II of Fig. 1.

Fig. 3 is a fragmentary sectional view taken on line III—III of Fig. 1; and

Fig. 4 is a similar view taken on line IV—IV of Fig. 3.

The illustrated example of one use of the load-carrying structure for tractors indicates how any type of implement or material handling equipment may be operatively attached to a conventional four wheel tractor 10.

The small combine is generally designated by the numeral 12 and is shown on the frame of load-carrying structure 14, merely as an example of the manner in which the tractor 10 may be manipulated to and from operative position under its own power.

2

The structure 14 comprises a normally horizontal frame 16 of rectangular form and having wheel 18 at one side thereof, while a pair of laterally and forwardly projecting arms 20 and 22 respectively are on the frame 16 at the opposite side thereof.

To fully accomplish the best results, arm 22 at the normally forward end of frame 16 is curved and terminates closer to frame 16 than does arm 20. This arm 20 is preferably straight, terminates substantially on the longitudinal axis of tractor 10, and in the form of a forwardly extending branch 24 on the free end whereof is a coupling, shown clearly in Figs. 3 and 4. The coupling includes a head 26 having an opening formed therethrough for the reception of a pin 28. A socket 30 mounted on the draw bar or other part of tractor 10, has opposed elongated openings shown in dotted lines of Fig. 3 to accommodate pin 28 when the parts are in the position illustrated in Fig. 4. Socket 30 is flared outwardly to present a funnel-shaped mouth for receiving head 26, as fully hereinafter described.

The coupling on arm 22 is as detailed in Fig. 2. A socket-type bearing 32 is a part of arm 22. A ball 34 carried by the axle or other portion 36 of tractor 10 between its front steering wheels 38, enters bearing 32 when the frame 14 is associated with tractor 10.

In the instance shown, combine 12 is operatively connected to the tractor 10 by a power take-off 40 which forms no part of this invention, but which indicates one manner of practical use thereof.

The lateral and forward disposition of arms 20 and 22 permits tractor 10 to be backed into place where the coupling on the rear arm 20 may serve to receive power to swing the combine 12 and frame 16 from the position shown in dotted lines to the place shown in full lines of Fig. 1. When the tractor has its front end swung to the location where coupling members 32 and 34 may be connected, pin 28 is then inserted and the work of interconnecting is completed.

The distance between arms 20 and 22, and the form of these arms, allows the quick and effective manipulation, just set forth. Removing tractor 10 from operative relation is accomplished without moving the combine 12 and its supporting structure 14. Front coupling is first loosened, then the pin 28 is removed, whereupon, the tractor is driven from its position beside the frame 16 and between arms 20 and 22.

When the tractor 10 and frame 14 are arranged as above detailed, and as illustrated in the drawing, the load is balanced between wheel 18 and the four wheels of tractor 10. Uneven terrain may be negotiated and small mounds or rocks will not shift the load to any one wheel, as is often the case when presently known hitches are employed. This is made possible through the coupling for arm 22 as previously described which permits pivoting of arm 22 during up and down movement of any of the four wheels 38 or of wheel 18. Similarly, branch 24 of arm 20 may swing up and down as head 26 pivots on pin 38. Pin 38 will slide in the elongated openings in socket 30, allowing branch 24 to partially rotate about its axis as the terrain between wheels 38 and wheel 18 varies. Thus, through the arrangement of these two coupling devices compensation is permitted when encountering substantially all differences in terrain without binding or undue strain between the tractor and the frame which would tend to twist the frame out of shape or break the parts thereof.

Having thus described the invention, what is claimed as new and desired to be secured by Letters Patent is:

1. Load carrying structure for tractors comprising a substantially rectangular frame; a wheel mounted on the frame at one side thereof; an arm extending laterally from the opposite side of the frame at each end thereof; and coupling means at the free ends of the arms and on the tractor for attaching the structure to the tractor, the arm at the forward end of the frame being arched to enter between the front and rear wheels of the tractor and to terminate in a length substantially tangent to the longitudinal axis of the tractor, the arm at the rear end of the frame being L-shaped and terminating with a leg thereof on the longitudinal axis of the tractor and between the rear wheels of the latter, the coupling between the tractor and the arm at the rear thereof having a head rigid to the arm and a flared-mouth socket to guide the head into position on the longitudinal axis of the tractor as the tractor is backed against the head and to hold the head in place during continued backing of the tractor to move the ends of the arm at the forward end of the frame into place where the coupling means thereon and on the tractor may be interengaged.

2. Load carrying structure for tractors comprising a substantially rectangular frame; a wheel mounted on the frame at one side thereof; an arm extending laterally from the opposite side of the frame at each end thereof; and coupling means at the free ends of the arms and on the tractor for attaching the structure to the tractor, the arm at the forward end of the frame being arched to enter between the front and rear wheels of the tractor and to terminate in a length substantially parallel to the longitudinal axis of the tractor, the arm at the rear end of the frame being L-shaped and terminating with a leg thereof on the longitudinal axis of the tractor and between the rear wheels of the latter, the coupling means between the arm and said tractor having structure permitting limited, independent movement of the tractor around the coupling means when said wheel on the frame or the wheels of the tractor are raised or lowered.

3. Load carrying structure for tractors comprising a substantially rectangular frame; a wheel mounted on the frame at one side thereof; an arm extending laterally from the opposite side of the frame at each end thereof; and coupling means at the free ends of the arms and on the tractor for attaching the structure to the tractor, the arm at the forward end of the frame being arched to enter between the front and rear wheels of the tractor and to terminate in a length substantially parallel to the longitudinal axis of the tractor, the arm at the rear end of the frame being L-shaped and terminating with a leg thereof on the longitudinal axis of the tractor and between the rear wheels of the latter, the coupling means between the arm at the rear of the frame and said tractor having a flared socket, and means for pivotally holding the arm in place at the base of said socket, said pivotal connection serving to allow relative movement between the arm and the tractor about a horizontal axis.

CURTIS C. BALDWIN.

REFERENCES CITED

The following references are of record in the file of this patent:

UNITED STATES PATENTS

| Number | Name | Date |
| --- | --- | --- |
| 2,335,942 | Hyman | Dec. 7, 1943 |
| 1,478,482 | Marriot et al. | Dec. 25, 1923 |
| 1,608,172 | Herr | Nov. 23, 1926 |